(12) United States Patent
Griffin

(10) Patent No.: US 10,708,542 B1
(45) Date of Patent: Jul. 7, 2020

(54) VIDEO CONFERENCE CALL CAMERA FOR AN AUTOMOBILE

(71) Applicant: Clifford D. Griffin, Lake Alfred, FL (US)

(72) Inventor: Clifford D. Griffin, Lake Alfred, FL (US)

( * ) Notice: Subject to any disclaimer, the term of this patent is extended or adjusted under 35 U.S.C. 154(b) by 0 days.

(21) Appl. No.: 16/110,588

(22) Filed: Aug. 23, 2018

Related U.S. Application Data

(60) Provisional application No. 62/549,210, filed on Aug. 23, 2017.

(51) Int. Cl.
*H04N 7/14* (2006.01)
*H04W 4/40* (2018.01)
*H04N 5/225* (2006.01)

(52) U.S. Cl.
CPC ........... *H04N 7/142* (2013.01); *H04N 5/2252* (2013.01); *H04W 4/40* (2018.02)

(58) Field of Classification Search
CPC ........ H04N 5/217; H04N 5/222; H04N 5/225; H04N 5/232; H04N 5/2252; H04N 7/14; H04N 7/141; H04N 7/142; H04N 7/144; H04N 7/147; H04N 7/15; H04N 7/152; H04N 7/155; H04N 7/157; H04N 21/00; H04N 21/41422; H04W 4/40
USPC ......... 348/14.01, 14.02, 14.03, 14.04, 14.05, 348/14.06, 14.07, 14.08, 14.09, 14.1, 348/14.11, 14.12, 14.13, 14.14, 15.15, 348/14.16; 382/275; 379/265.03; 455/414.1, 566; 704/370
See application file for complete search history.

(56) References Cited

U.S. PATENT DOCUMENTS

| | | | | |
|---|---|---|---|---|
| 6,205,716 B1 | 3/2001 | Peltz | | |
| 7,092,802 B2 | 8/2006 | Baldassa | | |
| 7,440,290 B2* | 10/2008 | Matthews | ............. | G06F 3/0338 338/69 |
| 7,661,890 B2* | 2/2010 | Basho | .................... | G03B 27/58 348/143 |
| 8,072,481 B1* | 12/2011 | McNelley | .............. | H04N 7/144 348/14.01 |
| 8,092,101 B2* | 1/2012 | Basho | .................... | G03B 27/58 396/427 |
| 8,289,724 B2* | 10/2012 | Matthews | ............. | G06F 3/0338 338/69 |
| 8,320,893 B2 | 11/2012 | Suurmeyer et al. | | |
| 8,344,870 B2* | 1/2013 | Evans | ................. | G06F 3/04817 340/461 |
| 8,947,500 B1* | 2/2015 | McNelley | .............. | H04N 7/144 348/14.08 |
| 2003/0128288 A1* | 7/2003 | Kawamura | ........ | H04N 5/23209 348/335 |
| 2005/0134504 A1 | 6/2005 | Harwood et al. | | |
| 2005/0254200 A1* | 11/2005 | Matthews | ............. | G06F 3/0338 361/600 |

(Continued)

*Primary Examiner* — Khai N. Nguyen
(74) *Attorney, Agent, or Firm* — Cramer Patent & Design, PLLC; Aaron R. Cramer

(57) ABSTRACT

A digital camera is integrated into the dashboard of an automobile which features the ability to participate in video conference calls with an occupant of the vehicle. The camera will be configured to be in communication with a vehicle microphone, touchscreen and adjustable rollerball control. Wireless communication will also be enabled. The camera is further configured to prohibit operation of the camera while the automobile is not in park.

8 Claims, 3 Drawing Sheets

(56) References Cited

U.S. PATENT DOCUMENTS

| | | |
|---|---|---|
| 2006/0199612 A1 | 9/2006 | Beyer et al. |
| 2007/0142026 A1 | 6/2007 | Kuz et al. |
| 2008/0124069 A1* | 5/2008 | Basho .................... G03B 27/58 396/427 |
| 2008/0288092 A1* | 11/2008 | Matthews ............. G06F 3/0338 700/61 |
| 2010/0111516 A1* | 5/2010 | Basho .................... G03B 27/58 396/427 |
| 2010/0127847 A1* | 5/2010 | Evans ................. G06F 3/04817 340/461 |
| 2014/0303807 A1 | 10/2014 | Addepalli et al. |
| 2015/0002950 A1* | 1/2015 | O'Neill .................... G02B 7/14 359/827 |
| 2015/0046183 A1* | 2/2015 | Cireddu ................. G16H 10/60 705/3 |
| 2016/0349600 A1* | 12/2016 | Macmillan ........... G03B 17/561 |
| 2017/0264864 A1* | 9/2017 | McNelley ............. H04N 7/144 |
| 2018/0120674 A1* | 5/2018 | Avivi ................. G02B 27/0075 |

* cited by examiner

VIDEO CONFERENCE CALL CAMERA FOR AN AUTOMOBILE

RELATED APPLICATIONS

The present invention was first described in and claims the benefit of U.S. Provisional Patent Application No. 62/549,210 filed on Aug. 23, 2017, the entire disclosures of which are incorporated herein by reference.

FIELD OF THE INVENTION

The present invention relates generally to the field of video conference call cameras for automobiles.

BACKGROUND OF THE INVENTION

Recent advances in technology have resulted in an increasingly mobile workforce. These days, almost as many workers are found out on the road and at job sites as is in a conventional office. Like most people, many of these workers utilize mobile telephones which are capable of placing video conference calls. However, a growing number of workers who multitask while driving, are relying less on their mobile telephone to conduct work because of new laws which prohibit the operation of a mobile telephone while driving or out of a general concern for safety. As such, many workers who work out of their vehicles rely on built in on-board communication systems such as OnStar® and similar systems.

Such systems often have greater power and voice clarity made possible by external antennas, virtually unlimited electrical power, and hi-fidelity speakers and microphones compared to their hand-held counterparts. These systems typically do not possess the ability to transmit video due to the lack of a camera. In an era of "Facetime" personal calls and "Skype" business conference calls, this lack of ability presents a disadvantage to these workers. Accordingly, there exists a need for a means by which on board, vehicle based cellular communication systems can be provided with the ability to transmit live video signals. The development of the video conference call camera for an automobile fulfills this need.

SUMMARY OF THE INVENTION

In view of the foregoing disadvantages inherent in the prior art, it has been observed that there is need for a video conference call camera for an automobile.

To achieve the above and other objectives, the present invention provides for a video conference device comprising a camera assembly, a roller ball assembly and a switch assembly. The camera assembly is disposed within an automobile. The roller ball assembly and the switch assembly are configured to be in electrical communication with a power source. The camera assembly is capable of being operated by a touchscreen control panel of an automobile and is also capable of transmitting video data. In at least one separate embodiment, the device may also constitute a cellular transmitter capable of sending and receiving cellular data. This embodiment may also be installed within the dashboard of an automobile.

The camera assembly may comprise a camera housing having a microprocessor capable of being in wireless communication with a remote device and a lens disposed upon an exterior face of the camera housing. The roller ball assembly may comprise a roller ball housing and a roller ball which is secured within the housing and in electrical communication with the microprocessor.

The switch assembly may comprise a switch housing and a switch which is disposed upon an exterior face of the switch housing and in electrical communication with the microprocessor. A position of the camera lens may be operably controlled by the roller ball. The camera lens may be capable of being secured in a given position by activation of the switch.

The device may further provide for an ignition interlock in electrical communication with the power source and the microprocessor which restricts the operation of the device to periods of time when the automobile is not being operated. The device may also have a microphone which is in electrical communication with the power source and is capable of receiving and transmitting an audio signal.

The device may also have a touch control display which is in electrical communication with the power source and the microprocessor and permits a user to operate the device. Additionally, a wi-fi transmitter may also be provided which is in electrical communication with the power source and the microprocessor.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
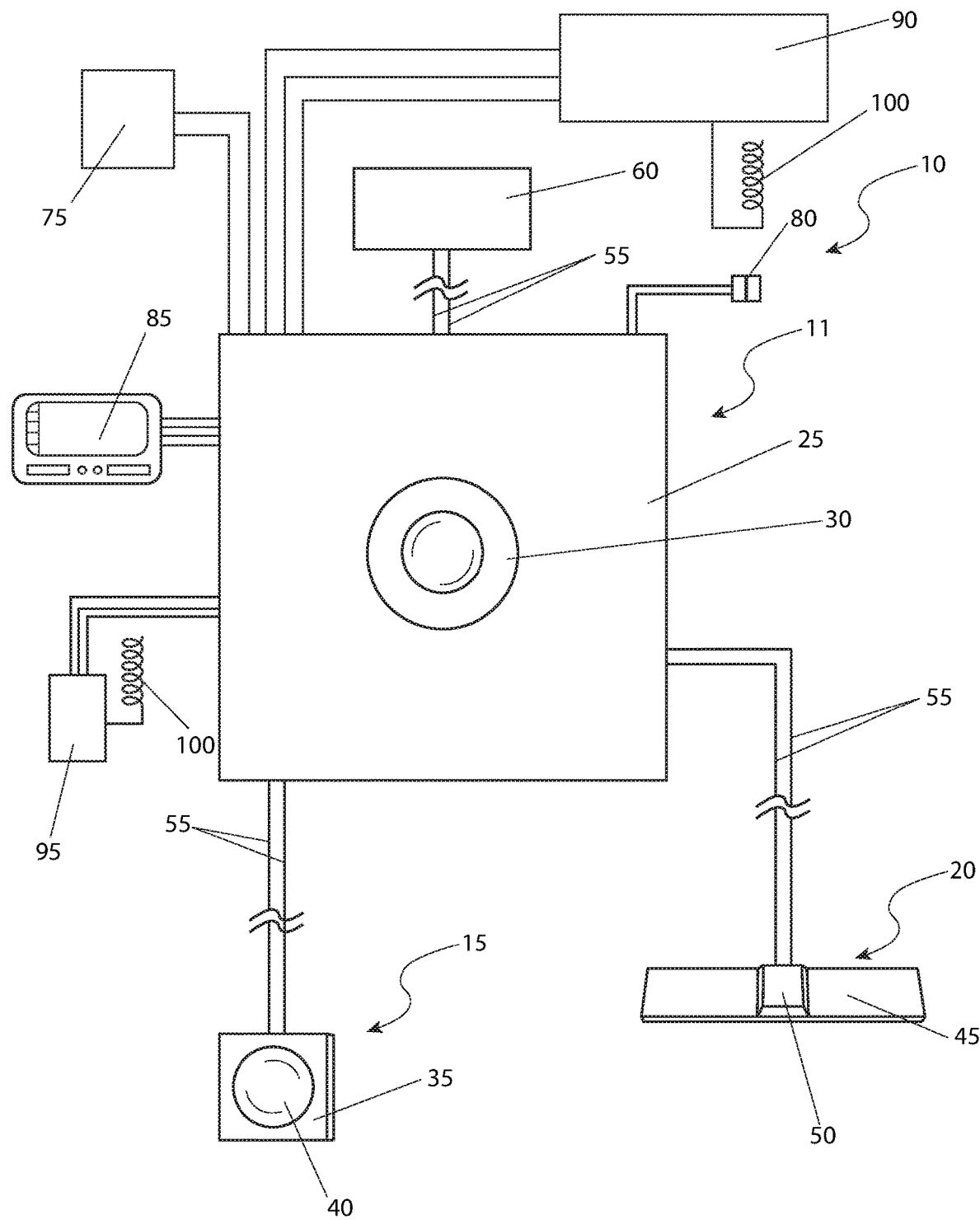
FIG. 1 is a front elevation view of video conference call camera for an automobile 10, according to the preferred embodiment of the present invention.

DESCRIPTIVE KEY 10 video conference call device
11 camera assembly
15 roller ball assembly
20 lock switch assembly
25 camera housing
30 lens
35 roller ball housing
40 roller ball
45 lock switch housing
50 lock switch
55 wire
60 power source
70 automobile
75 ignition interlock
80 entertainment system microphone
85 touchscreen control display
90 cellular transmitter
95 Wi-Fi transmitter
100 antenna
105 vehicle-based mobile video conferencing system network
110 radio frequency (RF) signal
115 radio frequency (RF) base station
120 hard wired communication system 125 wireless communication system
130 stationary user
135 mobile user
140 smart phone

DESCRIPTION OF THE INVENTION

Figure 2:
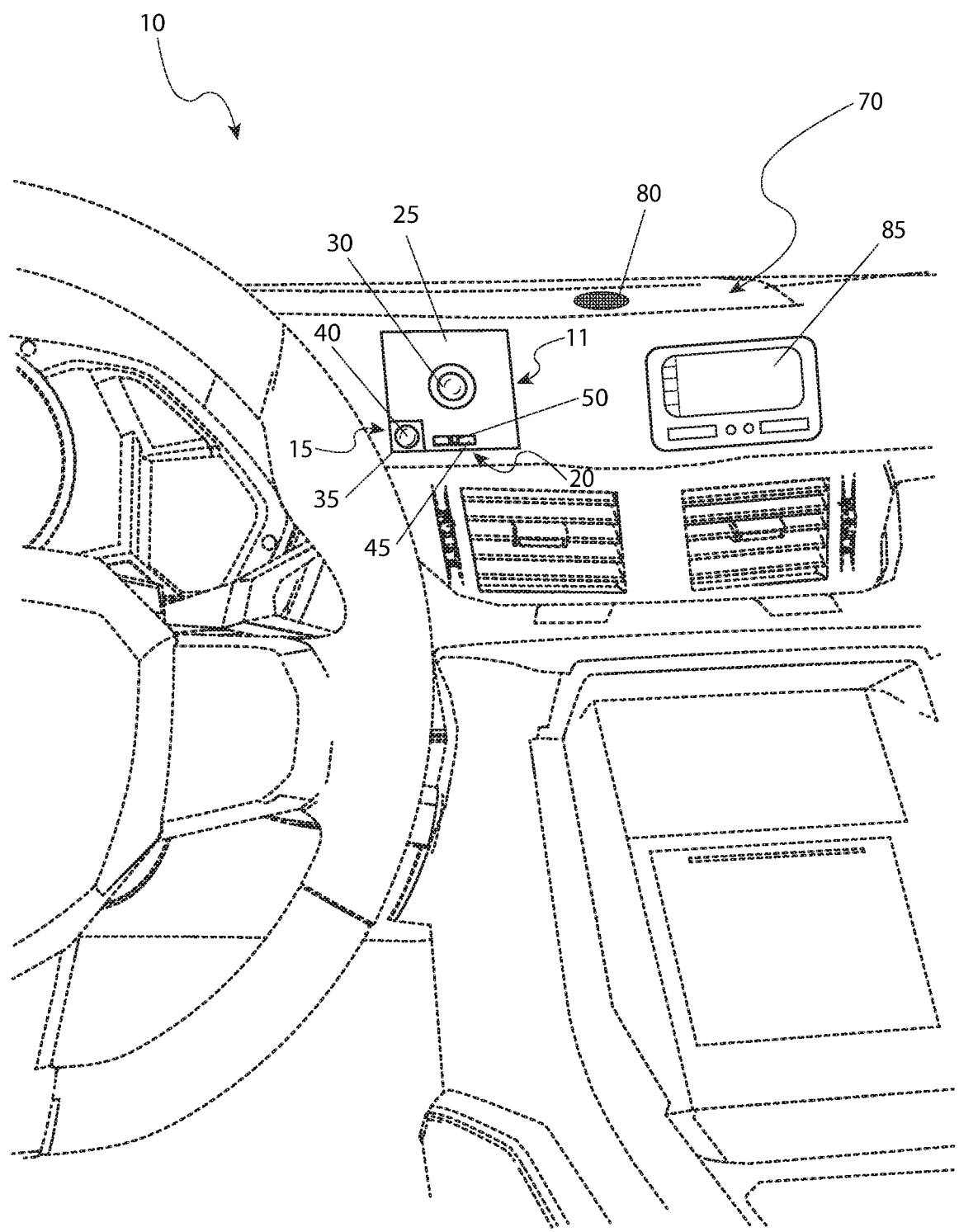
FIG. 2 is a perspective environmental view of video conference call camera for an automobile 10, according to the preferred embodiment of the present invention; and, FIG. 3 is a pictorial representation of a vehicle-based mobile video conferencing system network 105, utilizing a video conference call device 10, according to the preferred embodiment of the present invention.
Figure 3:
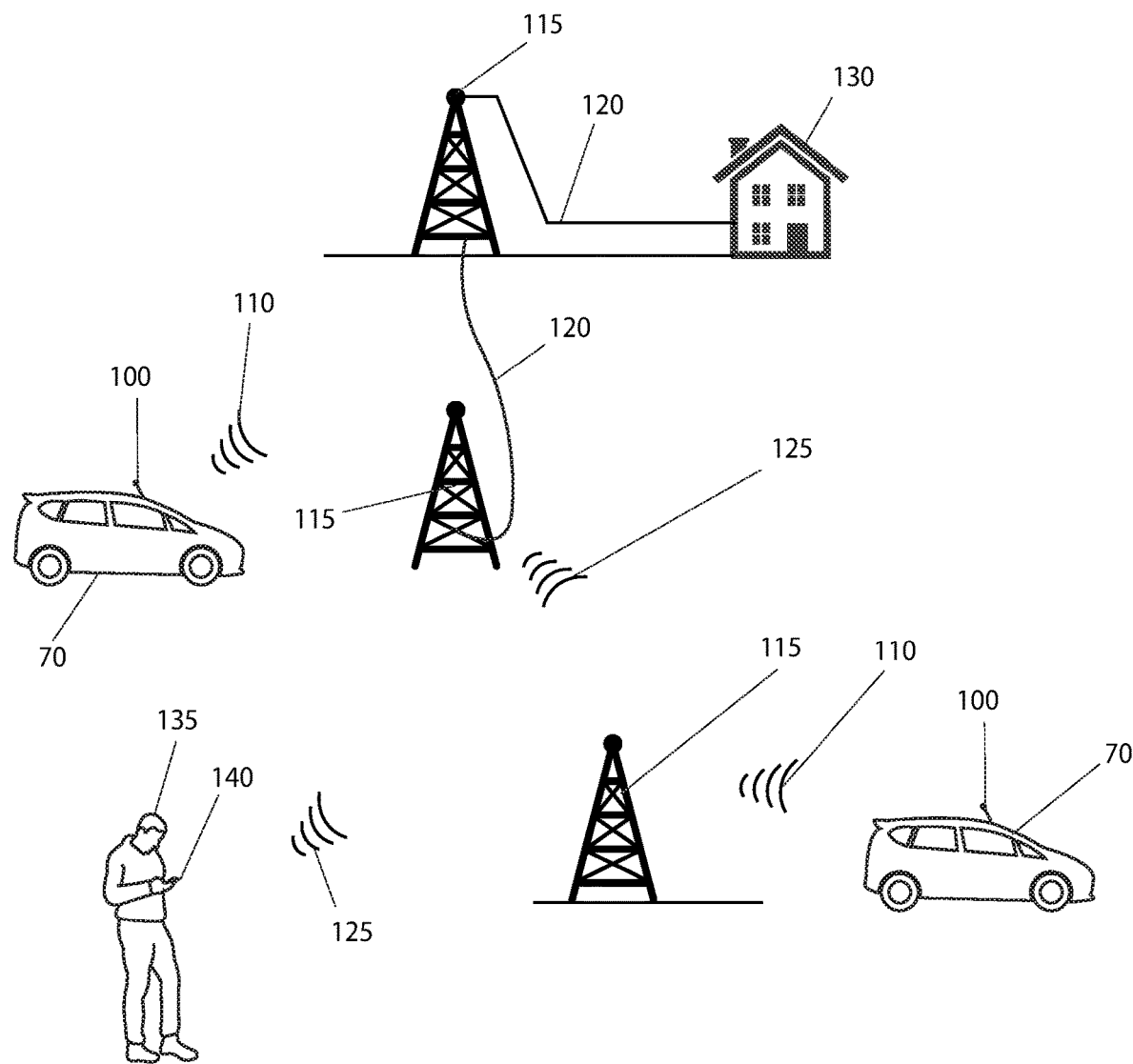

The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

1. DETAILED DESCRIPTION OF THE FIGURES

Referring now to FIG. 1, a front elevation view of video conference call camera for an automobile 10 (hereinafter the "device"), according to the preferred embodiment of the present invention, is disclosed. The device 10 comprises a camera assembly 11 in electrical communication with a power source 60. The power source 60 may be that of the automobile battery (not shown) or a dedicated rechargeable battery (not shown). The device 10 also comprises a lock switch assembly 20 in electrical communication with the camera assembly 11 and a roller ball assembly 15 which is likewise in electrical communication with the camera assembly 11. The roller ball assembly is in electrical communication with said camera assembly via a first plurality of wires. The lock switch assembly is in electrical communication with the camera assembly via a second plurality of wires. The camera assembly is disposed within a dashboard of an automobile, the camera assembly is in direct electrical communication with a power source via a third plurality of wires, said power source is an automobile battery.

The camera assembly 11 comprises a camera housing 25 having a camera lens 30 disposed upon an exterior face of the camera housing 25 and having secured within a microprocessor (not shown) and a wireless receiver (not shown). The camera lens 30 is configured to receive and process video data through the camera lens 30 via electrical communication with the microprocessor. The microprocessor is capable of encoding the video data received through the lens 30 and transmit the same wirelessly through the wireless receiver.

The roller ball assembly 15 comprises a roller ball housing 35 which moveably secures a roller ball 40 therein. The roller ball 40 is configured to electrically communicate the direction into which the camera lens 30 is pointed. A first direction of the roller ball 40 necessitates a first direction of the camera lens 30, a second direction of the roller ball 40 necessitates a second direction of the camera lens 30 and so on. The roller ball 40 may also be rotated in a third direction about its vertical axis thereby causing the camera lens 30 to zoom in or the roller ball 40 may be rotated in a fourth direction about its vertical axis thereby causing the camera lens 30 to zoom out.

The lock switch assembly 20 comprises a lock switch housing 45 having a lock switch 50 secured therein. The lock switch 50 is in electrical communication with the camera lens 30 and enables a user to secure the camera lens 30 in place upon actuation of the lock switch 50. It is envisioned that the lock switch 50 may comprises a slide switch having a first position and a second position denoting "locked" and "unlocked". However, this should not be construed as a limiting factor of the lock switch 50 which may also comprise a button, lever or the like.

It is envisioned that the device 10 will permit a user to communicate via video conferencing with other appropriately enabled devices via an established wireless communication method such as cellular telephone service, FaceTime®, Bluetooth® or OnStar®. An interface to an ignition interlock 75 is provided to restrict operation of the device 10 to periods of time when an automobile 70 (see FIG. 2) is not being driven. This feature may be either mitigated or disengaged should the device 10 be installed in a self-driving automobile (not shown). It is further envisioned that the device 10 will be capable of receiving and transmitting audio via an entertainment system microphone 80. The device 10 will be interfaced to the touchscreen control display 85 to provide control interface as well as displaying the returned video conference system from the individual on the other end of the video conference call. All wireless transmission is accomplished by either a cellular transmitter 90 or a Wi-Fi transmitter 95, both of which equipped with a respective antenna(s) 100. The cellular transmitter 90 allows interface to standard cellular networks for the purposes of communication and will likely rely upon an existing vehicle based cellular system such as OnStar® or the like. It is noted however that the use of any particular cellular transmitter 90 is not intended to be a limiting factor of the present invention. The Wi-Fi transmitter 95 would rely on use on interfacing with existing Wi-Fi access points such as those found at libraries, restaurants, coffee shops and other similar locations where the vehicle equipped with the device 10 could be parked nearby for access. Additionally, the Wi-Fi transmitter 95 with its respective antenna 100 could interface to portable hotspots furnished by cellular communication firms or by the use of wireless interface to owner provided smart phones in which internal hotspots are activated.

Referring next to FIG. 2, a perspective environmental view of video conference call camera for an automobile 10, according to the preferred embodiment of the present invention, is disclosed. The environmental view comprises an automobile 70 having the camera assembly 11, roller ball assembly 15 and slide switch 20 installed therein. The particular model of automobile 70 displayed in FIG. 2 is merely illustrative of one (1) embodiment of the device 10 and should not be construed as limited to that particular configuration. It is envisioned that the device 10 may be installed into any type of vehicle e.g., automobile, truck, train, plane or the like which possesses suitable architecture to accommodate the camera assembly 11, roller ball assembly 15 and slide switch 20. To provide two-way communication abilities, the automobile 70 would be equipped with an entertainment system microphone 80 as well as a touchscreen control display 85 which are typically standard equipment on most modern day automobiles 70. Outgoing speech is picked up by the entertainment system microphone 80, while incoming video is displayed upon the touchscreen control display 85 and the incoming sound is reproduced by the sound system (not shown). It is preferred that the lens 30 of the camera assembly 11 is sized to be as inconspicuous as possible and not interfere with line-of-sight of the vehicle operator. Such a size is approximately thirty millimeters (30 mm.) or the size of a United States half-dollar currency coin.

Referring finally to FIG. 3, a pictorial representation of a vehicle-based mobile video conferencing system network 105, utilizing a video conference call device 10, according to the preferred embodiment of the present invention is disclosed. The automobile 70 equipped with the device 10 emits a radio frequency (RF) signal 110 which is picked up by an existing radio frequency (RF) base station 115, herein depicted as a cellular communication tower. However it is noted that other types of base stations such as Wi-Fi hotspots or the like could be utilized with equal effectiveness. Once received by the radio frequency (RF) base station 115, the radio frequency (RF) signal 110 is converted for use in other existing hard wired communication systems 120 and/or wireless communication systems 125. At this point in time, the video conferencing signal can be utilized by other users including but not limited to stationary users 130 using personal computers, tablet computers, or the like, as well as mobile users 135 using smart phones 140. In effect, existing video conferencing systems, either stationary or mobile, can easily interface in a vehicle-based mobile environment in a same manner without the user of the automobile 70 juggling current solutions in an un-safe manner.

2. OPERATION OF THE PREFERRED EMBODIMENT

The preferred embodiment of the present invention can be utilized by the common user in a simple and effortless manner with little or no training. It is envisioned that the device 10 would be constructed in general accordance with FIG. 1 through FIG. 3.

To utilize the device 10, each component i.e., the camera assembly 11, the roller ball assembly 15 and the slide switch 20 would need to be installed into an automobile 70 and put into electrical communication with a power source 60, an ignition interlock 75, an entertainment system microphone 80, a touchscreen control display 85, a cellular transmitter 90 and/or a Wi-Fi transmitter 95. Once installed, a user may activate the device 10 via the touchscreen control display 851 of the automobile 70, manipulate the camera lens 30 by means of the roller ball 40 into an acceptable viewing angle, lock the camera lens 30 into place by activation of the lock switch 50 and proceed to converse via video. As noted above, the roller ball 40 may also be rotated about its vertical axis thereby causing the camera lens 30 to zoom in or out depending upon the direction of the rotation.

The user, through interface with existing vehicle-based mobile video conferencing system network 105 networks, can communicate with stationary users 130 and mobile users 135 using both audio and video signal for either business or personal reasons in a manner which is not only high quality but safe as well. The device 10 may be utilized by the user to take and store pictures utilizing the camera assembly 11. Additionally, the device 10 may be utilized when the automobile 70 is being operated when the device 10 is controlled by a user positioned in the back seat of the automobile 70.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A video conference device, comprising:
   a camera assembly having a camera housing with a microprocessor in wireless communication with a remote device and a lens disposed upon an exterior face of said camera housing;
   a roller ball assembly having a roller ball housing and a roller ball secured within said roller ball housing and in electrical communication with said microprocessor;
   a lock switch assembly having a switch housing and a switch disposed upon an exterior face of said switch housing and in electrical communication with said microprocessor; and
   an ignition interlock in electrical communication with a power source and said microprocessor, wherein said ignition interlock restricts operation of said video conference device to periods of time when an automobile is not being operated;
   wherein said roller ball assembly is in electrical communication with said camera assembly via a first plurality of wires;
   wherein said lock switch assembly is in electrical communication with said camera assembly via a second plurality of wires;
   wherein said camera assembly is disposed within said automobile;
   wherein said camera assembly is in direct electrical communication with said power source via a third plurality of wires, said power source is an automobile battery;
   wherein said camera assembly is operated by a touch-screen control panel of said automobile;
   wherein said camera assembly is transmitting video data;
   wherein a position of said camera lens is operably controlled by said roller ball; and
   wherein said camera lens is secured in said position by activation of said switch.

2. The device of claim 1, further comprising a microphone in electrical communication with said power source and said microprocessor receiving and transmitting an audio signal.

3. The device of claim 2, further comprising a touch control display in electrical communication with said power source and said microprocessor;
   wherein said touch control permits a user to operate said device.

4. The device of claim 3, further comprising a wi-fi transmitter in electrical communication with said power source and said microprocessor.

5. A video conference device, comprising:
   a camera assembly having a camera housing with a microprocessor in wireless communication with a remote device and a lens disposed upon an exterior face of said camera housing;
   a roller ball assembly having a roller ball housing and a roller ball secured within said roller ball housing and in electrical communication with said microprocessor;
   a lock switch assembly having a switch housing and a switch disposed upon an exterior face of said switch housing and in electrical communication with said microprocessor;
   a cellular transmitter; and
   an ignition interlock device in electrical communication with a power source and said microprocessor, wherein said ignition interlock device restricts operation of said video conference device to periods of time when an automobile is not being operated;

wherein said roller ball assembly is in electrical communication with said camera assembly via a first plurality of wires;

wherein said lock switch assembly is in electrical communication with said camera assembly via a second plurality of wires;

wherein said camera assembly is disposed within a dashboard of said automobile;

wherein said camera assembly is in direct electrical communication with said power source via a third plurality of wires, said power source is an automobile battery;

wherein said camera assembly is operated by a touchscreen control panel of said automobile;

wherein said camera assembly is transmitting video data; and wherein said cellular transmitter is interfacing with at least one cellular network;

wherein a position of said camera lens is operably controlled by said roller ball; and wherein said camera lens is secured in said position by activation of said switch.

6. The device of claim 5, further comprising a microphone in electrical communication with said power source and said microprocessor receiving and transmitting an audio signal.

7. The device of claim 6, further comprising a touch control display in electrical communication with said power source and said microprocessor;

wherein said touch control permits a user to operate said device.

8. The device of claim 7, further comprising a wi-fi transmitter in electrical communication with said power source and said microprocessor.

* * * * *